United States Patent
Dalheimer

(10) Patent No.: US 6,618,248 B1
(45) Date of Patent: Sep. 9, 2003

(54) HOUSING SYSTEM FOR HOUSING ELECTRONIC COMPONENTS, ESPECIALLY FLAT DESKTOP PC OR MULTIMEDIA HOUSING

(76) Inventor: Volker Dalheimer, Erbacher Strasse 37a, D-64747 Breuberg (DE)

( * ) Notice: Subject to any disclaimer, the term of this patent is extended or adjusted under 35 U.S.C. 154(b) by 0 days.

(21) Appl. No.: 09/926,687

(22) PCT Filed: May 31, 2000

(86) PCT No.: PCT/EP00/05022
§ 371 (c)(1),
(2), (4) Date: Mar. 12, 2002

(87) PCT Pub. No.: WO00/74458
PCT Pub. Date: Dec. 7, 2000

(30) Foreign Application Priority Data

Jun. 1, 1999 (DE) ..................... 299 09 556 U

(51) Int. Cl.[7] .................................. G06F 1/20
(52) U.S. Cl. ................. 361/687; 361/695; 361/724; 312/223.1; 312/223.2; 454/184
(58) Field of Search ................. 361/683, 685, 361/687, 692–695, 724–727; 312/223.1, 223.2; 165/104.32, 104.33, 104.34, 122; 364/708.1; 454/184

(56) References Cited

U.S. PATENT DOCUMENTS

| | | | | |
|---|---|---|---|---|
| 5,440,450 A | * | 8/1995 | Lau et al. ................. | 361/695 |
| 5,600,538 A | * | 2/1997 | Xanthopoulos ............. | 361/683 |
| 5,694,294 A | * | 12/1997 | Ohashi et al. .............. | 361/687 |
| 6,315,655 B1 | * | 11/2001 | McEwan et al. ............ | 454/184 |
| 6,525,936 B2 | * | 2/2003 | Beitelmal et al. ........... | 361/695 |

FOREIGN PATENT DOCUMENTS

| | | |
|---|---|---|
| DE | 90 05 147 | 7/1990 |
| DE | 91 08 160 | 10/1991 |
| JP | 10 098139 | 4/1998 |

OTHER PUBLICATIONS

Cole–Gupta: "Push/Pull Cooling System with Single Blower. Dec. 1982." IBM Technical Disclosure Bulletin, Bd. 25, Nr. 7B Dec. 1, 1982.

Doody–Gupta: "Induced Cooling a Unit Cooling Scheme. Dec. 1982." IBM Technical Disclosure Bulletin, Bd. 25, Nr. 7B Dec. 1, 1985.

* cited by examiner

*Primary Examiner*—Michael Datskovsky
(74) *Attorney, Agent, or Firm*—Oblon, Spivak, McClelland, Maier & Neustadt, P.C.

(57) ABSTRACT

The invention relates to a housing system for housing electronic components, especially a flat desktop PC or multimedia housing. A fresh-air duct is provided in the interior of said housing and is mounted substantially in parallel to the base plate and spaced apart therefrom at a predetermined height. Said fresh-air duct, apart from lateral air intake openings, is sealed from the housing and at the intake side of the chambers or section that are located in the interior of the housing. At the end of the fresh-air duct facing away from the air intake openings a recess is provided which accommodates the fan. Said fan blows vertically into the chamber below the fresh-air duct, the lower chamber communicating with a lateral exhaust duct. The warmed-up exhaust air is forced through said exhaust duct and is laterally discharged from the housing. In the flow direction below the fan at least one electronic component and one heat source are mounted against which the fan blows. A second recess in the fresh-air duct is located upstream of the recess in which the fan is accommodated. Said second recess accommodates a component to be cooled, said component extending into the lower chamber.

18 Claims, 5 Drawing Sheets

HOUSING SYSTEM FOR HOUSING ELECTRONIC COMPONENTS, ESPECIALLY FLAT DESKTOP PC OR MULTIMEDIA HOUSING

DESCRIPTION

1. Field of the Invention

The invention relates to a housing arrangement for accommodating electronic assemblies, in particular a flat desktop PC or multimedia housing, comprising a bottom plate, front and rear sides, as well as a hood-type, removable cover, a fan driven by an electric motor, and chambers or sections formed in the housing, according to the preamble of claim 1.

2. Discussion of the Background

From the German Utility Model G 91 08 160.2 an outer housing for a magnetooptical mass storage is known which comprises a fan which introduces a directed air stream into the housing via a suitable filter in such a manner that said air stream can be directed through the drive of the storage. With such a housing, the current supply is arranged at a lateral distance from the housing and is also cooled by means of a partial air stream. The use of a filter is necessary because contamination of the write/read unit of a magnetooptical storage can result in the failure of same.

A so-called compact industrial computer is disclosed in Utility Model G 90 05 147.5. Therein, the possibility of cooling components which are located within the computer is also provided for. To be concrete, shorter plug-in boards and a fan installed in the front are to be utilised so that the installation depth is reduced compared to that which has previously been known. With a switchgear cabinet installation, the air is to be drawn in in the front area and discharged in the rear area of the housing. With a stand-alone installation in a contaminated environment the housing according to G 90 05 147.5 is sealed, and filters are employed. The provided fans blow in opposite directions so that an air circulation under utilisation of air baffles can be achieved within the computer. In an embodiment the filter mats are replaced by a heat exchanger so that a distinction is to be made between an internal air circulation circuit and an external heat dissipation.

In addition, a cooling unit with optimised cooling air control within a data processing system is known from IBM Technical Disclosure Bulletin, Vol. 25, No. 7B, December 1982. The fan provided therein is arranged near a CPU heat sink connected with same, with the air stream via intake openings in the housing being first utilised for a switching power supply unit and only then for cooling of the CPU. The air discharge opening is located on the housing top.

The above described housing arrangements with integrated ventilation, however, have a not optimised cooling air flow in common, in particular under the aspect of an undesired noise generation. With housing arrangements which accommodate electronic devices, e.g. multimedia means and which are also employed in home applications, it is generally required to keep the noise emission of the device itself, which the user conceives as annoying, at a low level.

BRIEF SUMMARY OF THE INVENTION

From the above it is therefore the object of the invention to specify a further developed housing arrangement for the accommodation of electronic assemblies, in particular a flat desktop PC or multimedia housing, which achieves an optimised cooling of the components located in its interior with a simultaneous minimum noise emission so that, on the one hand, legal requirements for the application of such devices at the workplace are met and, on the other hand, the use of such a device in the private area is not experienced as annoying.

The solution of the object of the invention is by means of a subject matter according to the characteristics of claim 1, with the dependent claims comprising at least suitable embodiments and further developments.

According to the invention, a fresh air duct is provided in the interior of the housing, which extends essentially parallel to the base plate and spaced apart from same at a predetermined height, with the fresh air duct, apart from lateral air intake openings, being sealed at the suction side against the remaining housing and the chambers or sections which are located in the interior of the housing.

At the far end of the air intake opening of the fresh air duct a recess is provided for the accommodation of a fan, with the fan being designed in such a manner that it blows vertically into the chamber located below the fresh air duct.

The lower chamber is communicating with a lateral exhaust air duct, via which the heated exhaust air is positively directed to be laterally discharged from the housing.

In the flow direction below the fan, at least one electronic assembly and heat source is located, in particular a CPU with heat sink, against which the fan blows. Upstream of the recess for accommodating the fan, a further recess is provided in the fresh air duct which serves for mounting an assembly to be cooled. This assembly extends into the lower chamber. The latter assembly can, in particular, be a hard disk drive, with the surface portion to be cooled being encompassed by the further recess. At the same time, there is the possibility to mount this hard disk in a sound-dampened manner by means of an elastic support in the further recess.

The fresh air duct can be manufactured from a sheet metal moulded part or an injection moulded part, with the hood-type cover possessing lateral air intake openings and sealing the fresh air duct from above.

In the lateral exhaust duct a current supply assembly, in particular a switching power supply unit is arranged in open frame construction. The exhaust duct is formed by a partition wall in the housing interior and the hood-type cover, with the cover comprising lateral openings for the air discharge.

The cover is, in particular, essentially of a U shape, with the air intake openings being formed in one leg and the air discharge openings being formed in the opposite second leg. These openings can be realised e.g. by punching or drilling.

Further assemblies to be cooled are arranged at the partition wall in the interior of the housing, being in thermal contact with same.

Due to the arrangement of an electronic assembly, in particular of a CPU with a passive heat sink below the fan, said heat sink is immediately blown against with an additional desired turbulence of the air stream being effected.

Apart from the sound-dampened support and mounting of the hard disk in the further recess, the fan may as well be secured in the first mentioned recess in a structure-borne insulated manner.

The fan builds up an overpressure within the lower chamber, with the partition wall in the interior of the housing comprising air through holes in a rear area. The partition wall is designed in the form of a double bevel, whereby a further chamber for accommodating the mentioned, in particular, open frame switching power supply unit is formed.

The longer side of the partition wall extends parallel and at a distance from the second leg of the cover, at least until the air discharge openings seen therein.

The at least one electronic assembly arranged in the lower chamber can be accessible from the front side of the housing via a flap, a sliding part, or similar means.

With the presented housing a special cooling air flow is obtained which originates from a lateral air intake with at first a horizontal course within the fresh air duct, with a reversal of direction vertically downward into the lower chamber, with an overpressure build-up and turbulence taking place thereafter. A further reversal of direction takes place horizontally into the lateral exhaust duct, with a pressure relief being effected via the lateral air discharge and the housing openings provided there which are opposite those for the air intake.

The housing concept is further characterised by a split level flat construction, with sources of considerable heat generation being located in a lower plane, sources of medium to low heat generation being located in a mid plane, and a fresh air duct with forced flow being located in an upper plane, with this forced flow extending from top to bottom and exiting laterally.

In the area of the air discharge adjacent to the lower plane, an exhaust duct is located which with respect to height covers all planes, in which at least one further, however, thermally non-critical heat source can be arranged.

According to the invention a directed suction of the cooling air is effected via a special fresh air duct, the suction side of which is sealed against the housing. This air duct simultaneously serves as an upper mounting of, in particular, a hard disk drive and has an opening or recess sealed against the hard disk housing in the area of the hard disk, via which the hard disk at its upper part is continuously subjected to the drawn in air and cooled.

The only fan used in the housing is supported and secured in a horizontal position at the end of the air duct in, for example, rubber or a similar elastic material and blows vertically downward directly against the passive heat sink of the CPU or the processor, respectively, which is located below. As mentioned, this results in an additional turbulence of the air flow which contributes to the cooling of the remaining electronic components.

Due to the sealing of the air duct against the housing, an overpressure is simultaneously generated within the housing, which by correspondingly generously dimensioned openings in the partition wall sealed against the housing, which simultaneously represents the exhaust duct, causes a directed air stream over the heat sink of the switching power supply unit and ensures its cooling. The recess for accommodating the mass storage is slightly larger dimensioned than the disk itself and preferably lined with cellular rubber. The hard disk is supported in this cellular rubber and in turn strongly urged against same by means of the suction duct via cellular rubber strips so that with this embodiment a stable immobile support is given and a structure-born sound transmission substantially avoided.

With the use of hard disk storage devices of very high speeds, this embodiment, in particular, succeeds on the one hand to dissipate the relatively high heat losses and, on the other hand, to reduce the generated noise.

The invention will be described in detail in the following with reference to an embodiment and to figures.

DETAILED DESCRIPTION OF THE INVENTION

Figure 1:
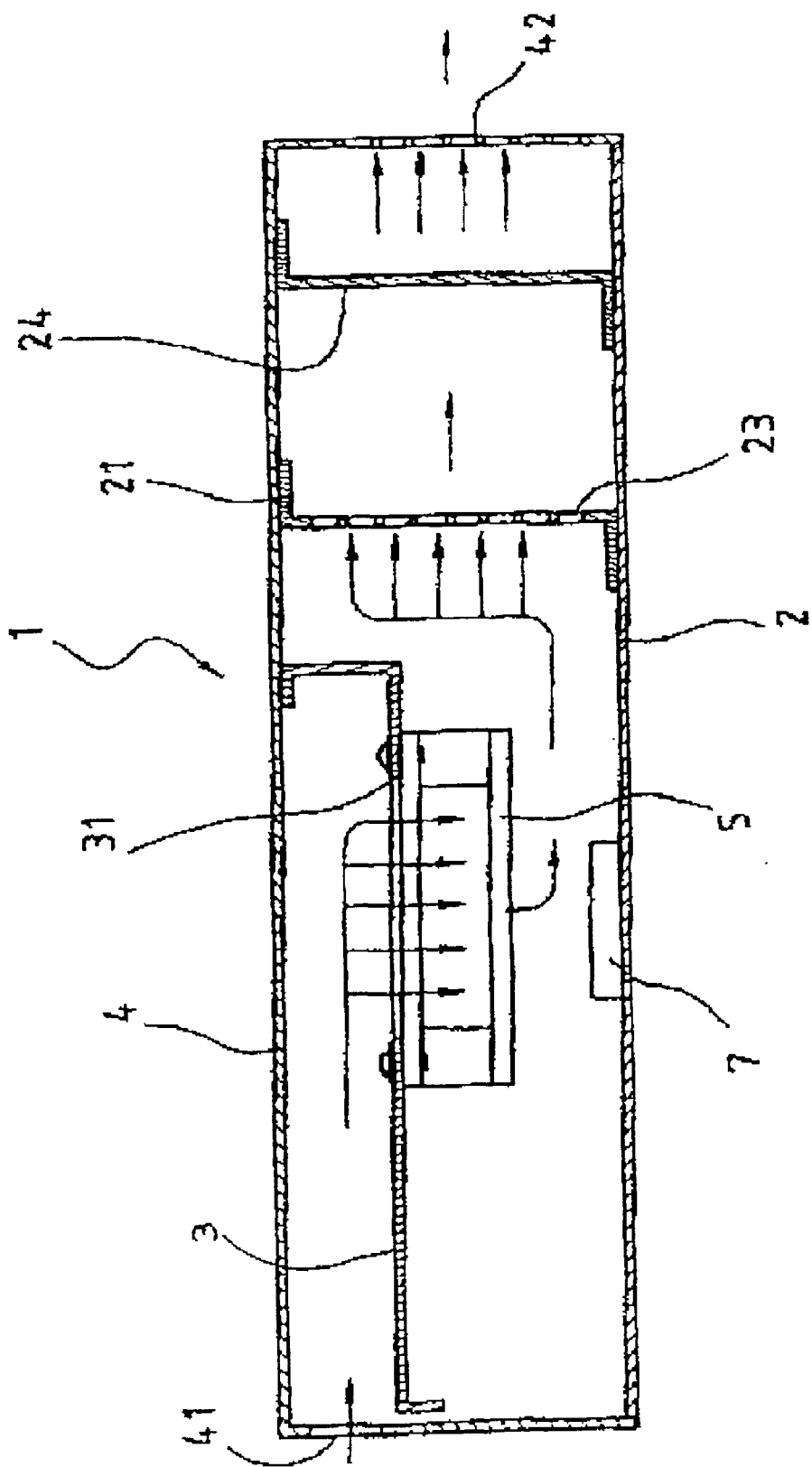
FIG. 1 shows a longitudinal section through a housing arrangement according to the embodiment.

The housing 1 according to the embodiment has a base plate 2 and a cover 4 with a U shape, The cover 4 is provided with air intake openings 41 as well as air discharge openings 42. A moulded part 3 forms a fresh air duct, with the duct communicating with the air intake openings 41 at the suction side. A recess 31 in the moulded part 3 accommodates a fan 5. This fan blows vertically downward and the air flow impinges on an electronic assembly, in particular a CPU with passive heat sink, which is located there.

In this lower area or in the lower chamber, respectively, of the housing, a turbulence and flow reversal towards a partition wall 21 in the interior of the housing take place, which comprises a bevel 23 with air through holes toward the exhaust duct. According to FIG. 3, a power supply unit can be accommodated in a portion 24 of the exhaust duct, in particular in a chamber formed therein.

Figure 2:
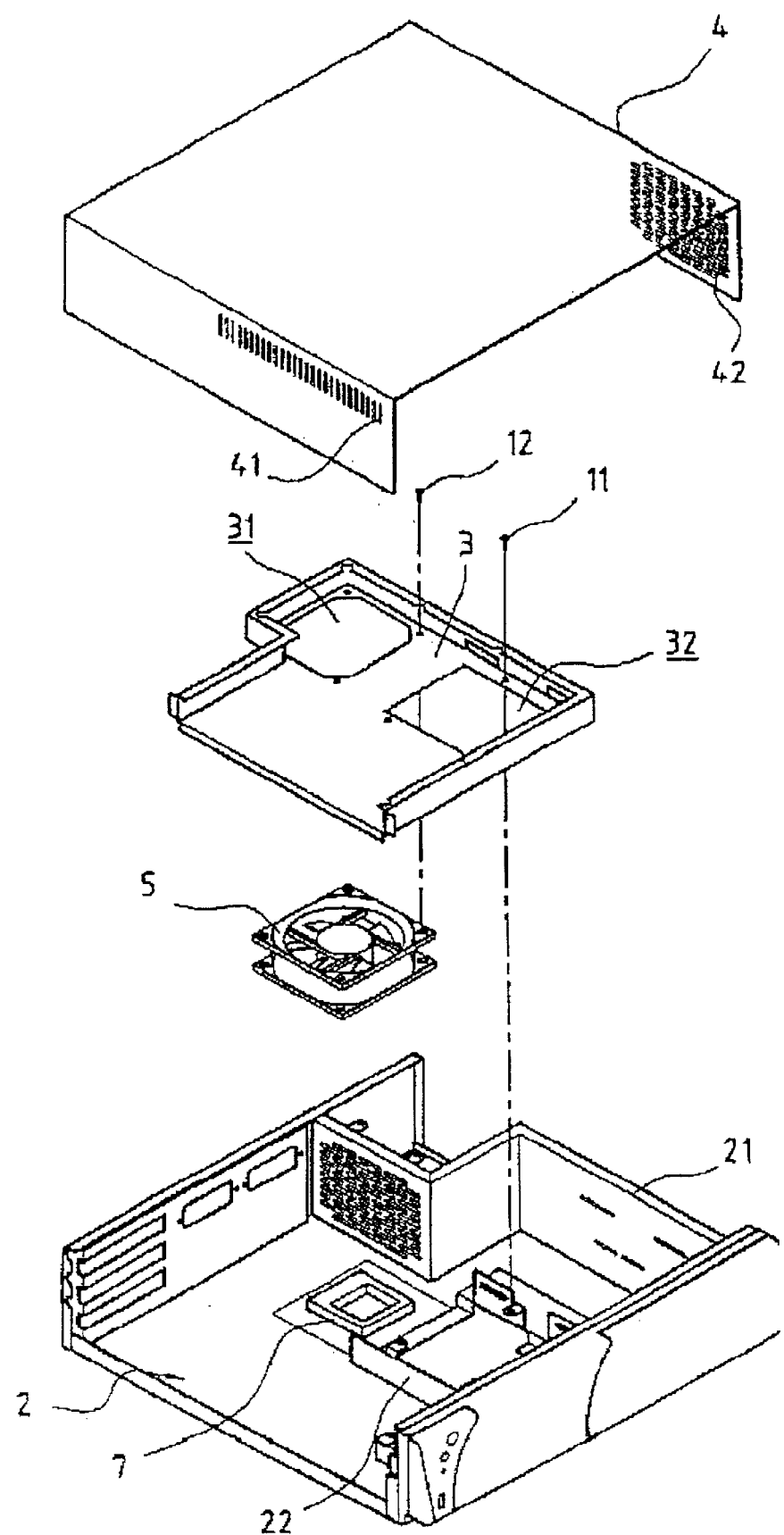
FIG. 2 shows an assembly drawing with fresh air duct, fan, and hood-type cover.

FIG. 2 shows the individual major housing components in a perspective form. The base plate 2 carries a mounting for a CPU, and a further mounting 22 with lateral guide is provided, e.g. for a hard disk, a DVD drive or an FDD drive. The partition wall 21 in the interior of the housing with the corresponding leg of the cover 4 forms the exhaust duct with a larger chamber within the bevel 23 (see FIG. 1) which serves to accommodate a switching power supply unit.

The moulded part 3 for forming the fresh air duct comprises the recess 31 for the fan and the recess 32 for a further assembly to be cooled, in particular the mentioned hard disk. 11 and 12 represent fasting bolts.

Figure 3:
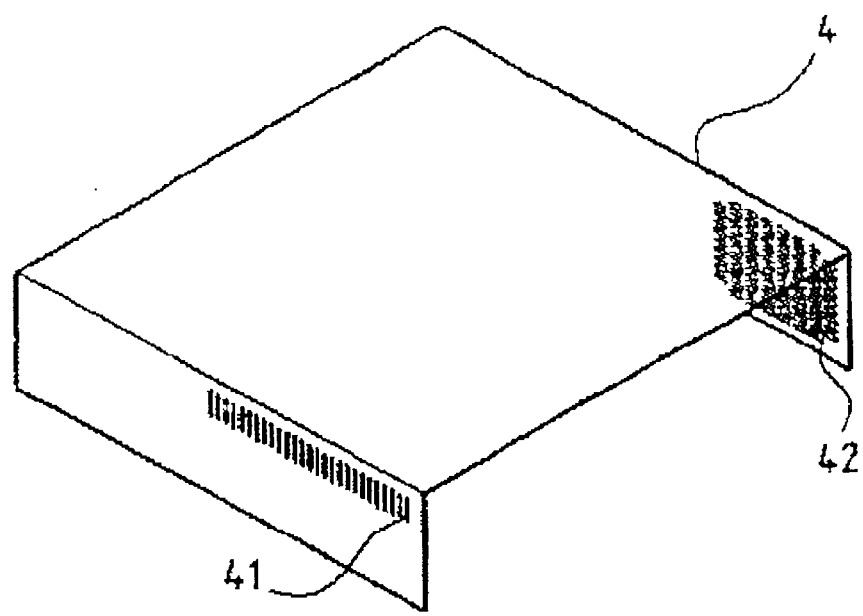
FIG. 3 shows an illustration with completely installed fresh air duct prior to the placement of the hood-type cover.
Figure 3:
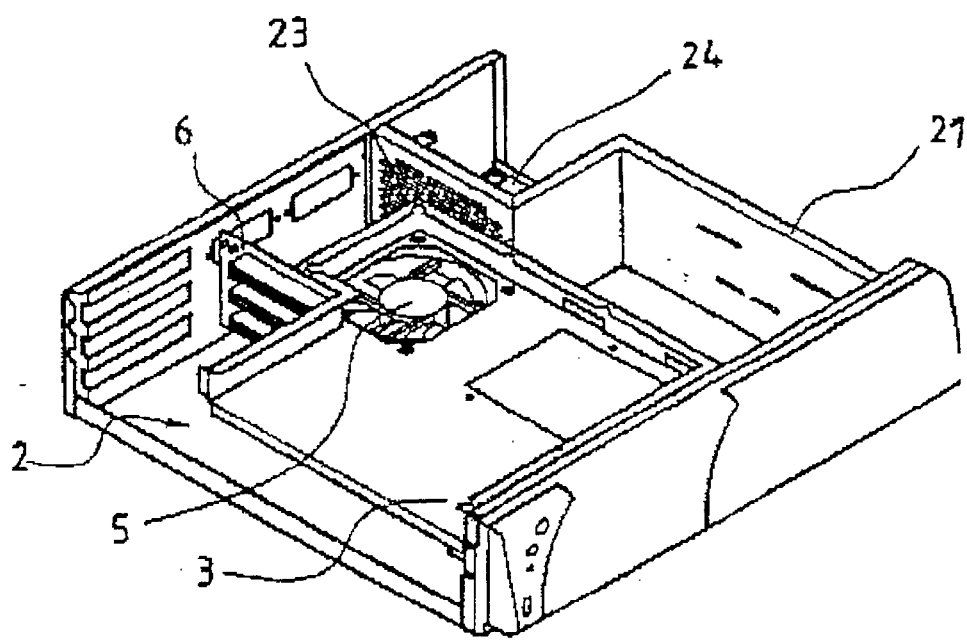

With the moulded part 3 installed including the fan 5 mounted therein the fresh air duct according to FIG. 3 can already be seen. From the left-hand side of the illustration fresh air flows into this duct via the openings 41 with the cover 4 installed and is directed by the fan vertically downwards to the electronic assembly which is located there. The resulting low pressure is then led via the bevel 23 with air through holes towards the exhaust duct 24, with this duct being formed by the partition wall 21 in the interior of the housing and the associated leg of the cover 4. In the lower chamber a board 6 with plug-and-socket connectors for the installation of wired circuit boards (not shown) is also provided.

Figure 4:
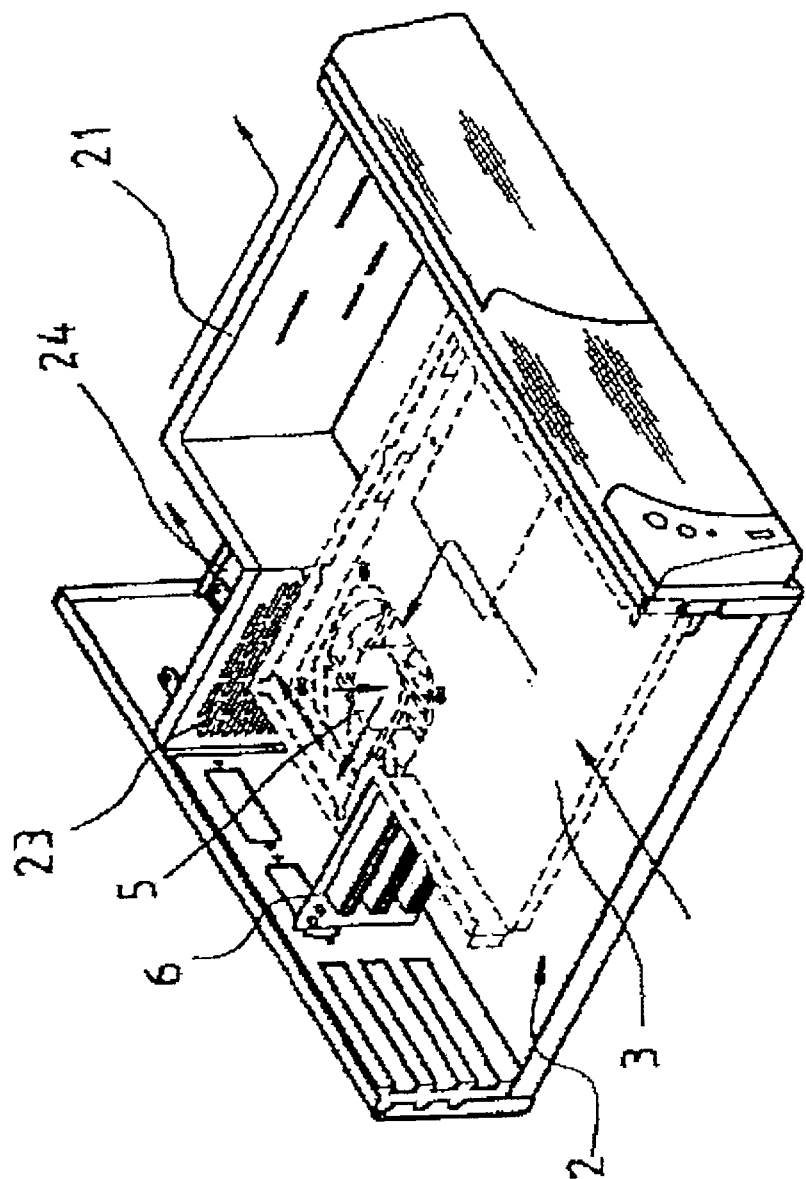
FIG. 4 shows a principal illustration of the flow.

The arrows shown in FIG. 4 once again clarify the fresh and exhaust air flow.

Accordingly, the air enters laterally with a horizontal course within the fresh air duct, a reversal of direction vertically downward into the lower chamber with overpressure build-up and turbulence, another reversal of direction horizontally into the lateral exhaust duct, and a pressure relief through the lateral air discharge via openings of the housing which are arranged opposite those for the air intake.

Figure 5:
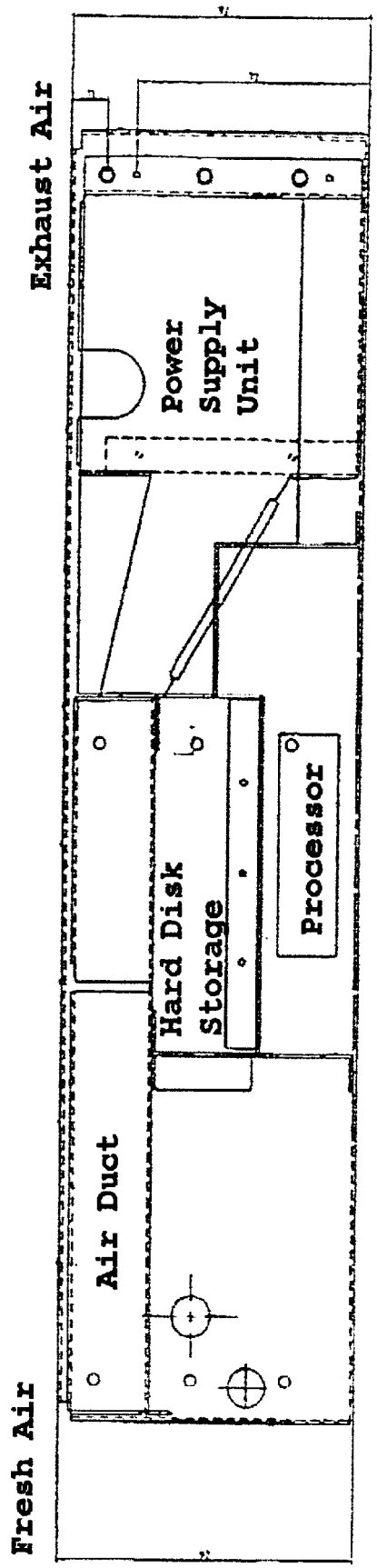
FIG. 5 shows a principal illustration of the split level housing construction.

The split level flat construction of the housing arrangement will explained with reference to FIG. 5. In a lower plane sources of significant heat generation, e.g. a processor circuit, are located. In a mid plane with less heat generation e.g. a hard disk storage is located whose upper end face which is preferably electrically conductive extends to an upper plane of a fresh air duct or is in a heat-related communication with this duct, respectively. The cooler fresh air is thus led from top to bottom and subsequently via an exhaust duct so as to exit laterally, with the power supply unit being arranged in the exhaust duct and further assemblies in thermal contact with the partition wall provided therein being located there.

As a whole, the above described housing arrangement optimally succeeds in cooling the accommodated electronic assemblies and components and simultaneously in a noised-dampened support of, in particular, mechanical disk storage devices. The housing parts can be manufactured in a simple manner by punching or bending techniques, but also by injection moulding, so that the overall costs are kept low. By the lateral intake and exhaust stream an undesired blowing at a person is prevented, who activates control elements located at the front side or is present near the front side. By arranging the fan or ventilator, respectively, in the interior of the housing far from air intake openings or air discharge openings an undesired contact of the rotor in the sense of a child safety measure is effectively prevented.

List of reference numerals
1 housing
2 base plate
3 moulded part
4 cover
41 air intake opening
42 air discharge openings
5 fan
6 board with plug-and-socket connectors
7 electronic assembly
11/12 fastening bolts
21 partition wall in the interior of the housing
22 mounting for hard disk
23 bevel of partition wall with air through holes toward the exhaust duct
24 exhaust duct portion
31 recess for fan
32 recess for further assembly to be cooled, in particular, hard disk

What is claimed is:

1. A housing arrangement for accommodating electronic assemblies, comprising:
   a bottom plate;
   front and rear sides;
   a hood-type, removable cover;
   a fan driven by an electric motor;
   chambers or sections formed in the housing;
   a fresh air duct located in the interior of the housing extending essentially parallel to and spaced apart from the bottom plate at a predetermined height, with the fresh air duct, apart from lateral air intake openings, being sealed at a suction side against the housing and the chambers or sections which are located in an interior of the housing;
   a first recess for accommodating a fan at a far end of the air intake openings of the fresh air duct, with the fan blowing vertically into a lower chamber located below the fresh air duct;
   a lateral exhaust duct communicating with the lower chamber and via which heated exhaust air is positively directed to be laterally discharged from the housing;
   at least one electronic assembly and heat source located in the flow direction below the fan; and
   a second recess located in the fresh air duct upstream of the first recess for accommodating the fan, which mounts an assembly to be cooled, said assembly extending into the lower chamber.

2. The arrangement according to claim 1, wherein the fresh air duct includes a sheet metal molded part or an injection molded part, with the hood-type cover including lateral air intake openings and sealing the fresh air duct from above.

3. The arrangement according to claim 1, further comprising a current supply assembly arranged in the lateral exhaust duct,
   wherein the lateral exhaust duct includes a partition wall in the interior of the housing and the hood-type cover, with the hood-type cover comprising lateral air discharge openings.

4. The arrangement according to claim 3, wherein the hood-type cover has essentially a U shape, with the air intake openings being formed in a first leg and the air discharge openings being formed in an opposite second leg.

5. The arrangement according to claim 3, further comprising additional assemblies to be cooled arranged at and in thermal contact with the partition wall in the interior of the housing.

6. The arrangement according to claim 1, further comprising a CPU with a passive heat sink arranged below the fan in the lower chamber, with an air stream blowing against the passive heat sink and the air stream being made turbulent.

7. The arrangement according to claim 1, wherein a heat emitting side of a hard disk storage is located in the second recess.

8. The arrangement according to claim 7, further comprising a sound-dampening support and mounting of the hard disk storage within the second recess.

9. The arrangement according to claim 3, wherein the fan builds up an overpressure in the lower chamber, with the partition wall in the interior of the housing comprising air through holes in a rear area.

10. The arrangement according to claim 9, wherein the partition wall comprises a double bevel forming a further chamber for accommodating the current supply assembly.

11. The arrangement according to claim 10, wherein a longer side of the partition wall extends parallel and at a distance from the second leg of the cover, at least until the lateral air discharge openings provided therein.

12. The arrangement according to claim 1, further comprising at least one electronic assembly arranged in the lower chamber and accessible from the front side of the housing via one of a flap and a sliding part.

13. The arrangement according to claim 3, wherein a cooling air stream flows through a lateral air intake with a horizontal course within the fresh air duct, makes a direction reversal vertically downwards into the lower chamber with pressure build-up and turbulence, makes a direction reversal horizontally into the lateral exhaust duct, and flows through the lateral air discharge openings of the housing, opposite the lateral air intake, to relieve pressure.

14. The arrangement according to claim 1, further comprising a split level construction,
   wherein sources of considerable heat generation are located in a lower plane, sources of medium to low heat generation are located in a mid plane, and the fresh air duct is located in an upper plane, with a forced air flow extending from top to bottom and exiting laterally.

15. The arrangement according to claim 14, further comprising an exhaust duct located in the area of the lower plane air discharge, which with respect to height covers all planes, and is configured to include at least one thermally non-critical heat source.

16. The arrangement according to claim 1, wherein the housing is a flat desktop PC or a multimedia housing.

17. The arrangement according to claim 3, wherein the current supply assembly is a switching power supply unit.

18. The arrangement according to claim 7, further comprising a sound-dampening support and mounting of the fan within the first recess.

* * * * *